United States Patent [19]

Ishigaki et al.

[11] Patent Number: 4,645,712

[45] Date of Patent: Feb. 24, 1987

[54] INFORMATION RECORDING MEDIUM

[75] Inventors: Masaji Ishigaki; Tetsu Ohishi; Nobuhiro Tokusyuku; Yoshie Kodera, all of Kanagawa; Yukio Fukui, Tokyo, all of Japan

[73] Assignee: Hitachi, Ltd., Tokyo, Japan

[21] Appl. No.: 795,453

[22] Filed: Nov. 6, 1985

[30] Foreign Application Priority Data

Nov. 9, 1984 [JP] Japan .................................. 59-234953

[51] Int. Cl.$^4$ ...................... B32B 15/04; G01D 15/34
[52] U.S. Cl. .................................... 428/433; 428/463; 428/913; 428/699; 346/135.1
[58] Field of Search ............... 428/433, 913, 699, 463; 346/135.1

[56] References Cited

U.S. PATENT DOCUMENTS

| | | | |
|---|---|---|---|
| 4,460,636 | 7/1984 | Watanabe | 428/212 |
| 4,461,807 | 7/1984 | Mori et al. | 428/699 X |
| 4,499,178 | 2/1985 | Wada et al. | 428/913 X |
| 4,525,412 | 6/1985 | Nakane et al. | 428/913 X |

Primary Examiner—P. C. Ives
Attorney, Agent, or Firm—Antonelli, Terry & Wands

[57] ABSTRACT

A information recording medium has characteristics of high sensitivity and high density. The medium has a double layer formed on a transparent substrate, the double layer comprising a highly transparent recording layer, for example, $Sb_2Se_3$ layer and a highly reflective layer, for example, Bi layer. The highly transparent recording layer includes Bi so as to set a minimum value of a reflection factor in prerecording 8 to 16 percentages.

7 Claims, 7 Drawing Figures

INFORMATION RECORDING MEDIUM

BACKGROUND OF THE INVENTION

This invention relates to an information recording medium, for example, an optical reflective video disc, a digital disc or a computer memory disc, especially an information recording medium having high recording sensitivity.

As the information recording medium on which information will be recorded and retrieved by a laser beam, methods for using optical characteristics of the medium, for example, a reflection factor (or, reflectivity), a transmission factor (or, transmissivity) or a refractive index, have been proposed. As described in Japanese Laid Open Patent Application Nos. 159,692/57 and 186,243/57, a recording film formed by a double layer structure of an optical absorption layer and a phase change layer has high sensitivity and high recording density. The optical absorption layer has a characteristic of optical absorption to effectively convert light to heat and also works as an optical reflective layer. The phase change layer, that is, a recording layer changes an optical characteristic in response to heat transmitted from the optical absorption layer, in which the laser beam is applied.

In the double layer structure, the reflection factor is determined by an optical interference-effect of the two layers forming the double layer. In order to get a large variation of the optical characteristic, for example, a reflection factor, between pre-recording and post-recording, the minimum value of the reflection factor in pre-recording has been selected. However, the reflection factor varies sharply in response to a thickness of the phase change layer. Namely, a slight deviation of the thickness of the phase change layer varies the total reflection factor of the information recording medium sharply, especially near the minimum value thereof. As a result, a yield rate for producing the information recording medium does not become so high. That is, in the prior art, it has been difficult to get the high sensitive information recording medium with high yield rate.

SUMMARY OF THE INVENTION

It is an object of this invention to provide an information recording medium having high sensitivity and high recording density.

It is another object to provide an information recording medium having a high yield rate of its production.

It is another object to provide an information recording medium having a small variation of a reflection factor at its minimum value in pre-recording.

To attain the above objects, according to the present invention, an information recording medium comprises a substrate and a double layer formed on the substrate, including a highly transparent recording layer and a highly reflective layer, a refractive index of the highly transparent layer being controlled in order to set a minimum value of a reflection factor a predetermined value. The minimum value of the reflection factor means a minimum value thereof, where a thickness of the highly transparent layer is varied. As the predetermined value of the reflection factor, 8 to 16 percentages are appropriate.

The reflection factor (R) of the information recording medium through the substrate is approximately described as the following formula.

$$R = \left| \frac{r_1 + r_2\exp(i2u_2a) + r_3\exp[i2(u_3b + u_2a)] + r_1r_2r_3\exp(i2u_3b)}{1 + r_1r_2\exp i2u_2a) + r_2r_3\exp(i2U_3b) + r_1r_3\exp[i2(u_3b + u_2a)]} \right|^2$$

Here, $r_j$ is an amplitude reflection factor between the j layer and the j+1 layer, when the substrate, the highly transparent recording layer, the highly reflective layer and an air layer are the first layer, the second layer, the third layer and the fourth layer, respectively. the amplitude reflection factor $r_j$ is described as the following.

$$r_j = \frac{(n_j + ik_j) - (n_{j+1} + ik_{j+1})}{(n_j + ik_j) + (n_{j+1} + ik_{j+1})}$$

Here, $(n_j+ik_j)$ is a complex refractive index and $u_j = 2\pi/\lambda \cdot (n_j + ik_j)$.

As apparent from the above formulas, the reflection factor (R) is determined by the complex refractive index and the thickness of each layer of the double layer. Therefore, it is possible to control the total reflection factor by controlling the complex refractive index $(n_2+ik_2)$ of the highly transparent recording layer, that is, the first layer. In order to control the complex refractive index $(n_2+ik_2)$, it is useful to add one of another metal elements or an alloy thereof into the first layer and to increase a percentage of a metal element of the component of the first layer.

As the another metal elements, Bi, Al, Ni, Cr, Co, Ti, Zr, Hf, Sn, Au, Ag, Zn, Pb, Ta, etc., which are not included in the materials of the first layer, can be used. Also, as the first layer, a compound of Se and an element selected from the group consisting of Te, In and Sb for example, $Sb_2Se_3$, $TeSe_2$, $InSe$, $In_2Se_3$, $In_2Se_3$, etc. can be selected, and as the second layer, Bi, Te, Al, Cr, Ti, Ni, Au, Ag, Cu, Hf, Zr, Sn, Zn, etc. and compounds thereof can be used.

DETAILED DESCRIPTION OF THE PREFERRED EMBODIMENTS

First, the information recording medium of the prior art will be briefly explained in connection with FIGS. 1 and 2. This prior art is disclosed in Japanese Laid Open Patent Application No. 186,243/57.

Figure 1:
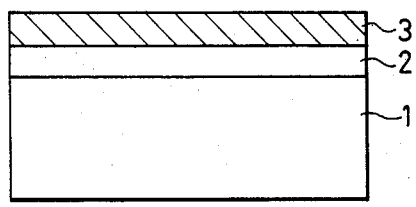
FIG. 1 shows a cross sectional diagram of an information recording medium in the prior art.
Figure 2:
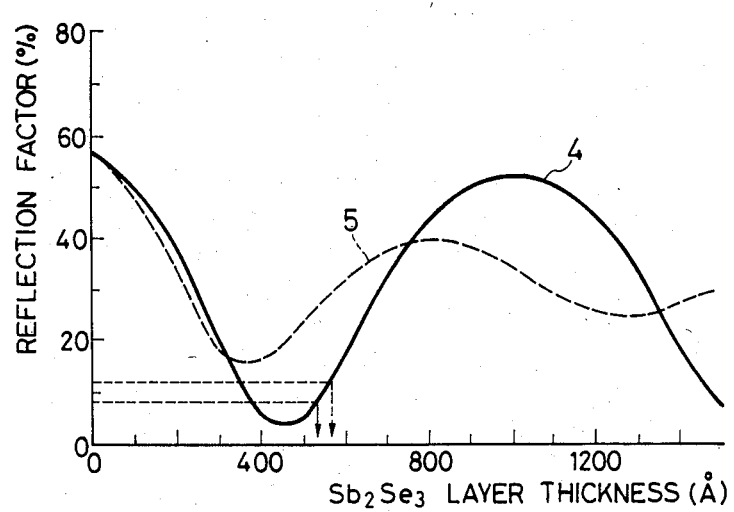
FIG. 2 illustrates reflection factor characteristics of the information recording medium in the prior art.

Referring to FIG. 1, on a glass or plastic substrate 1, for example, an acrylate resin substrate, having a transparent characteristic, a first layer 2 and a second layer 3 are formed. The first layer 2 is a phase change layer formed by an evaporation layer of antimony selenide ($Sb_2Se_3$), which has high transparency to a write light, for example, a layer diode light of 830 nm wave length and optical characteristics of which, i.e., a reflection factor, a transmission factor, etc. vary corresponding to heat. The second layer 3 deposited on the first layer 2 is an optical absorption and reflective layer formed by an evaporation layer of tellurium (Te), which has high absorption to the write light. The thickness of the second layer 3 is 400 Å. FIG. 2 shows the reflective factor of the double layer through the substrate 1 corresponding to the thickness of the first layer 2.

Referring to FIG. 2, curves 4 and 5 shows the reflection factor in pre-recording and the reflection factor in post-recording, respectively. Concerning the layer thickness of $Sb_2Se_3$, the recording sensitivity is not good at more than 1,000 Å. The thickness between 400 Å to 600 Å is appropriate, because it is possible to take a large ratio of the reflection factors between pre-recording and post-recording. However, for the practical use of the information recording medium, the reflection factor thereof in pre-recording must be larger than the reflection factor of the transparent substrate, that is, about 4%, in order to focus the write light on the recording layer through the substrate in a recording/retrieving apparatus having an auto focus system. From the view point of the recording characteristics, the reflection factor in pre-recording must be as small as possible.

Therefore, in general, the reflection factor in pre-recording is set at 8 to 16%, and a fluctuation range of the set value is determined ±20%. Therefore, when a tolerance value of the reflection factor is selected 10±2%, as shown in FIG. 2, a tolerance value of the thickness of the $Sb_2Se_3$ layer becomes 550±15 Å. As a result, it is difficult to get an adequate yield rate for producing the recording layer by a normal thickness control method.

Figure 3:
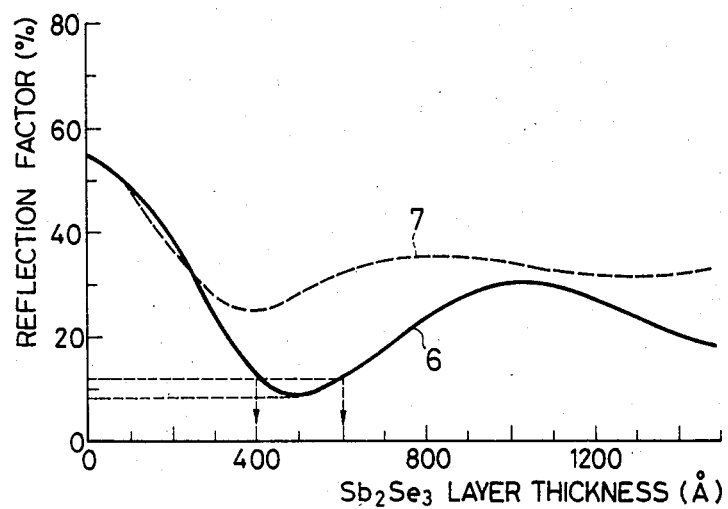
FIG. 3 illustrates reflection factor characteristics of the information recording medium of an embodiment of the present invention.

In contrast, according to the present invention, in case of forming the first layer 2, Bismuth (Bi) is mixed into the $Sb_2Se_3$ layer by simultaneously evaporating Bi and $Sb_2Se_3$. Bi has a high absorption characteristic to the laser diode light. An atomic percent of Bi to $Sb_2Se_3$ is 5%. Thereafter, the second layer 3 (Te) is formed on the first layer 2 by evaporation. The thickness thereof is 400 Å. FIG. 3 illustrates a relationship between the reflection factor of the recording layer and the thickness of the first layer. Curves 6 and 7 show the reflection factors in pre-recording and in post-recording, respectively. When 5 atomic percentages of Bi are mixed into the $Sb_2Se_3$ layer, a complex refractive index of the $Sb_2Se_3$ layer changes from $(3.8-i0.1)$ to $(3.8-i0.6)$, and as shown in FIG. 3, the minimum value of the reflection factor increases from 4% to 8% and approximately coincides with a desirable reflection factor. Further, when the tolerance value of the reflection factor is set to 10±2%, the tolerance value of the thickness of the $Sb_2Se_3$ layer becomes 500±100 Å, that is, increases sharply in comparison with the prior art. Therefore, according to this embodiment, the yield rate for forming the recording layer increases sharply. Also, since it is possible that the alteration rate of the reflection factor becomes 2 to 3 times, apparent from FIG. 3, so that recording/reproducing characteristics can be adequately maintained.

Figure 4:
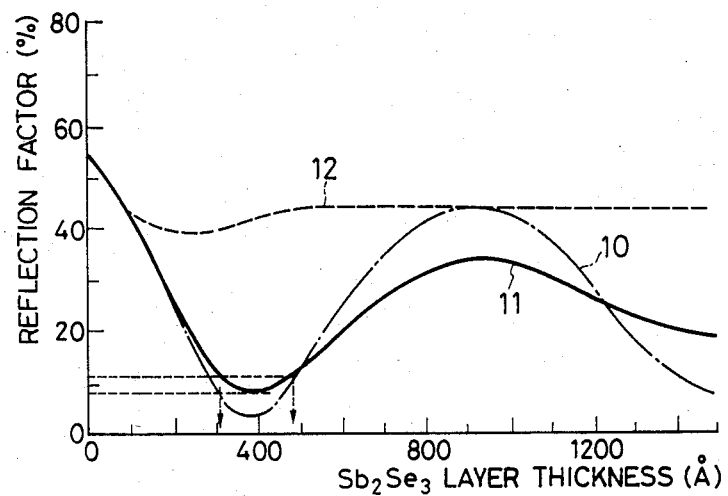
FIG. 4 illustrates reflection factor characteristics of the information recording medium of the second embodiment of the present invention.

Next, the second embodiment, in which Bismuth (Bi) is used as the second layer instead of Tellurium (Te), will be explained in connection with FIG. 4. The thickness of the Bi layer is 300 Å, and Bismuth (Bi) is also used as the metal element for improving the refraction index of the first layer ($Sb_2Se_3$). The density of Bi is set to 5 atomic percentages. FIG. 4 illustrates a relationship between the reflection factor and the thickness of the first layer. Curves 11 and 12 show the reflection factors in pre-recording and in post-recording, respectively. Curve 10 shows the reflection factor of the recording layer, in which Bi is not mixed. When Bi is mixed to the $Sb_2Se_3$ layer, the complex refraction index changes from $(3.8-i0.1)$ to $(3.8-i0.6)$. As a result, apparent from FIG. 4, the minimum value of the reflection factor in pre-recording becomes 8%, and for the tolerance value 10±2% of the reflection factor, the tolerance value of the thickness of the $Sb_2Se_3$ layer becomes 400±80 Å. The tolerance value of the layer thickness has been sharply increased. Further, in this embodiment, the large change of the reflection factor occurs with both a phase change of $Sb_2Se_3$ and a mutual diffusion of $Sb_2Se_3$ and Bi caused by heat in recording, so that it becomes possible to get good write-read characteristics.

Next, the third embodiment, in which Aluminum (Al) is used as the second layer instead of Tellurium (Te), will be explained. The optical absorption factor of Al is smaller than Bi and Te and the thermal conductivity is larger than those. Therefore, the thickness of the Al layer is set to 200 Å. The mixing amount of Bi to the first layer $Sb_2Se_3$ is set to 10~15% and the thickness thereof is set to 500 Å. As a result, the minimum value of the reflection factor in pre-recording is set between 8% and 16%. Further, the tolerance value of the thickness of the first layer becomes 500±80 Å. Therefore, it becomes possible to control the thickness by using the normal evaporation method.

In the above embodiments, $Sb_2Se_3$ is used as the first layer. However, it is not necessary to use a stoichiometric value of Sb-Se. That is, it is possible to use the composition Sb-Se, in which atomic percentages of Sb and Se are 20 to 60% and 40 to 80%, respectively. Further, for the first layer, a compound of Se and of Te, In, or Sb for example, $TeSe_2$, InSe, $In_2Se_3$, etc. can be used. Also, for the added material for controlling the refractive index of the first layer, metal elements except the elements used as the components of the first layer, for example, Te, Al, Ni, Cr, Co, Mn, In, Ge, Si, Ti, Zr, Hf, Sn, Cu, Au, Ag, Zn, Pb, Ta, etc. can be used. And, for the second layer, it is possible to use a metal layer of Al, Cr, Ti, Ni, Au, Ag, Cu, Hf, Zr, Sn, Zn, etc. and compounds thereof, for example, BiTe in order to get an effect of the present invention.

Figure 5:
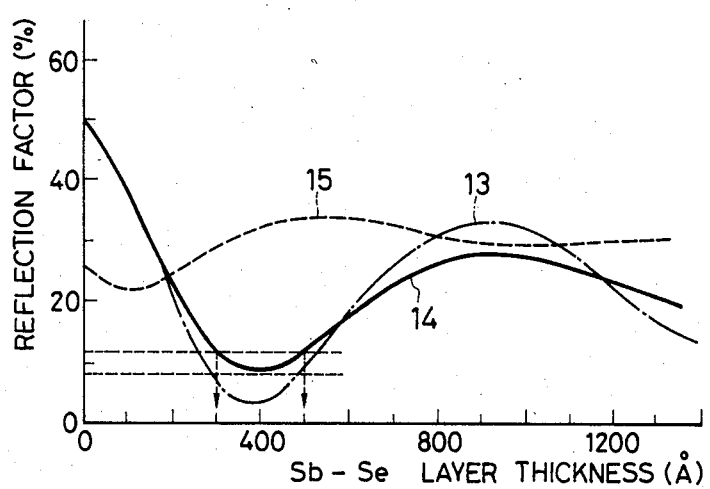
FIG. 5 illustrates reflection factor characteristics of the information recording medium of the fourth embodiment of the present invention.
Figure 6:
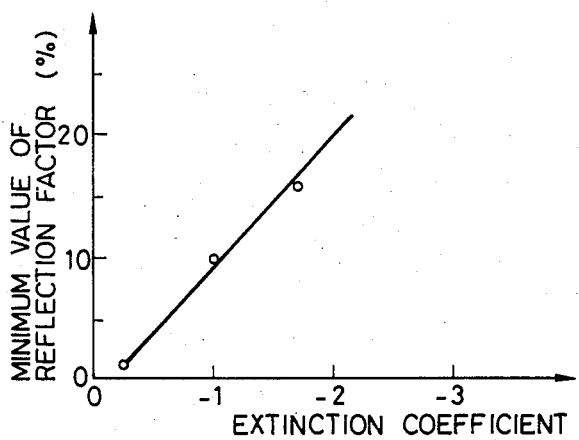
FIG. 6 shows a relationship between an extinction coefficient of a complex refractive index of the first layer and a minimum value of the reflection factor for explaining the present invention.

In the above embodiments, the metals Bi, Te, Al, etc., which are not used for the materials of the first layer, are mixed into the first layer for controlling the refraction index of the first layer. As another method, it is possible to control the refraction index by increasing the percentage of the metal element of the materials. For example, the first layer Sb-Se, which has a composition ratio 60:40 of the atomic percentage, that is, $Sb_{60}Se_{40}$, is formed on the substrate and the second layer of $Bi_2Te_3$ is formed on the first. When the thickness of the $Bi_2Te_3$ layer is 300 Å, the reflection factor of the information recording layer becomes a curve 14 as shown in FIG. 5. Since the minimum value of the reflection factor exists within the tolerance value 10±2% of the reflection factor, the tolerance value of the thickness of the $Sb_{60}Se_{40}$ layer becomes 400±100 Å. In comparison with the recording layer $Sb_2Se_3$, the characteristic of which is shown in a curve 13 in FIG. 5, the tolerance value of this embodiment becomes large sharply. The complex refraction index of the $Sb_{60}Se_{40}$ layer is (4.0−i1.0). Therefore, an imaginary part (or, an extinction coefficient) of the complex refraction index increases by raising the amount of Sb. In this case, a relationship between the minimum value of the reflection factor and the extinction coefficient of the reflection index is shown in FIG. 6. As apparent from FIG. 6, it is possible to control the minimum value by controlling the extinction coefficient of the refraction index. Further, as the refractive index of the second layer $Bi_2Te_3$ decreases from (2.8−i4.8) to (2.6−i3.0), the change of the reflection factor in post recording increases as shown in a curve 15 of FIG. 5, in comparison with the case of using Te, Al, etc. As a result, it becomes possible to get a good recording characteristic.

As described in the above embodiments, in order to control the minimum value of the reflection factor of the highly transparent recording layer, it is useful to control the value of the extinction coefficient of the first layer. For bringing the minimum value of the reflection factor within 8~16%, it is necessary to make the extinction coefficient −0.6~−1.7 by controlling the composition ratio of the first layer or the mixing ratio of the added metal element, etc.

Figure 7:
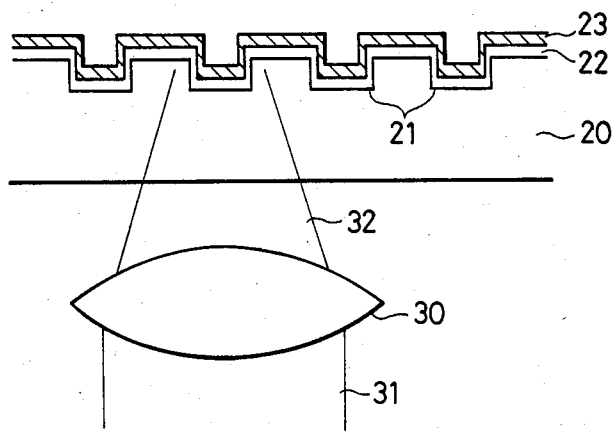
FIG. 7 shows a cross sectional diagram of another information recording medium and an optical lens for explaining the present invention.

The above embodiments have been explained that the information recording medium uses the flat substrate 1 as shown in FIG. 1. However, it is possible to use another substrate 20, which has tracking guide glooves 25 as shown in FIG. 7 and to form the double layer on the substrate 20. In this case, if a laser beam 31 is focused on the double layer 22 and 23 through the substrate 20 by lens 30, a reflection factor of a focused beam 32 becomes smaller than ones of the above embodiments, because there is a diffraction effect of the groove 25. Therefore, when the information recording medium shown in FIG. 7 is used, it is necessary to control the refractive index of the first layer in order to make an effective reflection factor at a groove part 8 to 16%.

Further, in the above embodiments, the first layer is formed on the substrate and the second layer is formed on the first layer. However, it is possible to form the second layer on the substrate and the first layer on the second layer. In this case, the laser beam has to be focused from a surface of the first layer.

Also, in the above embodiments, the information recording medium has been explained as a medium, in which information is recorded and from which information is reproduced. However, it is possible to use the present invention for a medium, from which information will be erased.

What is claimed is:

1. An information recording medium comprising:
   a substrate suitable for formation of said recording medium, and
   a double layer formed on said substrate, said double layer including a highly transparent recording layer and a highly reflective layer, said highly transparent recording layer being a compound of Se and an element selected from the group consisting of Sb, In and Te admixed with a metal element having a highly optical absorption characteristic selected from the group consisting of Bi, Al, Ni, Cr, Co, Ti, Zr, Sn, Hf, Au, Ag, Zn, Pb, and Ta, so that a refractive index of said highly transparent recording layer is set so as to control a minimum value of a reflection factor of said double layer to a predetermined value.

2. An information recording medium according to claim 1, wherein said predetermined value is 8 to 16 percentages.

3. An information recording medium according to claim 1, wherein said highly transparent recording layer is an admixture of $Sb_2Se_3$ and Bi.

4. An information recording medium according to claim 3, wherein said highly reflective layer is a layer of Bi.

5. An information recording medium according to claim 4, wherein said highly transparent recording layer is formed on said substrate and said highly reflective layer is formed on said highly transparent recording layer.

6. An information recording medium according to claim 1, wherein said substrate is glass or a resinous plastic material.

7. An information recording medium according to claim 1, wherein the atomic percentages of Sb and Se in said compound are respectively 20 to 60% and 40 to 80% and the metal element is admixed in amounts ranging from 5 to 15 atomic percent.

* * * * *